Figure 1:
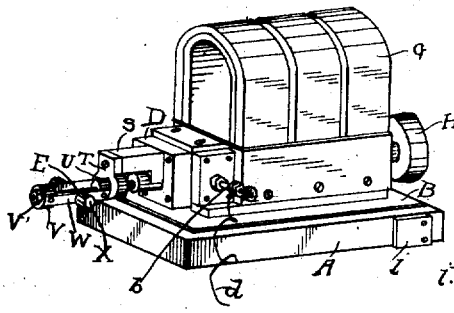

No. 12,165.

REISSUED NOV. 3, 1903.

G. W. HENRICKS.

SAFETY SPEED LIMITING MEANS.

APPLICATION FILED APR. 25, 1903.

2 SHEETS—SHEET 1.

WITNESSES:

Arthur Berger.

Harry J. Pearce

INVENTOR.

Garrett W. Henricks

BY

V. H. Lockwood

ATTORNEY.

No. 12,165.

REISSUED NOV. 3, 1903.

G. W. HENRICKS.

SAFETY SPEED LIMITING MEANS.

APPLICATION FILED APR. 25, 1903.

2 SHEETS—SHEET 2.

WITNESSES:

Arthur Berger.

Harry S. Pearce.

INVENTOR.

Garrett W. Henricks

BY

V. H. Lockwood

ATTORNEY.

No. 12,165. Reissued November 3, 1903.

UNITED STATES PATENT OFFICE.

GARRETT W. HENRICKS, OF INDIANAPOLIS, INDIANA, ASSIGNOR TO THE HENRICKS NOVELTY COMPANY, OF INDIANAPOLIS, INDIANA.

SAFETY SPEED-LIMITING MEANS.

SPECIFICATION forming part of Reissued Letters Patent No. 12,165, dated November 3, 1903.

Original No 675,351, dated May 28, 1901. Application for reissue filed April 25, 1903. Serial No. 154,269.

*To all whom it may concern:*

Be it known that I, GARRETT W. HENRICKS, of Indianapolis, county of Marion, and State of Indiana, have invented a certain new and useful Safety Speed-Limiting Means; and I do hereby declare that the following is a full, clear, and exact description thereof, reference being had to the accompanying drawings, in which like letters refer to like parts.

This invention relates to the transmission of power from large to small machines generally, and particularly to the class of relatively small electricity-generating machines which are designed specially for operation in connection with and to be driven by gas-engines for producing low-voltage electric currents whereby to explode the gas charges in the engines.

The object of the invention broadly is to provide means whereby such electricity-generating machines may be made available cheaply and practically under the varying conditions found in the operation of gas-engines without employing belts or gear-wheels.

The object specifically is to provide means whereby the shaft of the generator or its driving-pulley may be safely held in fixed positions, yet elastically with relation to the periphery of a rotative wheel of a gas-engine, so as to be impelled by the gas-engine without very forcible contact therewith at a greatly-reduced rate of speed of the periphery of the generator-pulley relative to the peripheral speed of the engine-wheel. The fixed positions referred to are those at which the generator-pulley may partake in a small degree of the movement of the engine wheel or pulley which drives the generator and avoiding that hard contact between the two pulleys or wheels as might rack the smaller machine or cause grinding of the faces of the pulleys, and thereby causing facets to appear on the smaller pulley. In order to avoid such deterioration of the generator-wheel and delicate parts of the smaller machine and at the same time effect the desired reduction of speed, I provide that after the engine and the generator may have been put in motion the generator-pulley may be drawn off and held in a fixed position, where it shall have but light contact and may be influenced by the most infinite contact with the engine-wheel. In case, however, there be slight variations from a true circle of the periphery of the engine-wheel or if its rim has a slightly-eccentrical path, due to the thrust of the piston or lost motion in the shaft-bearings, a slight contact may take place at the protruding parts as they pass the generator-pulley, and this minute contact if occurring, which may be regulated as to intensity, has been found to be sufficient in practice, as such generators require exceedingly small force for driving them, which is particularly true of my magneto-electric generator, shown herein in illustrating my improvements and which is effective at a comparatively slow rate of speed, while not requiring to be run at a uniform speed. I find it preferable to apply my position-retaining means directly to the pulley-shaft of the generator in order to eliminate all lost motion, although where provision is made for adjusting the shaft-bearings I may connect with the bearings or with other parts of the generator in order to maintain the desired fixed position.

Having given the general characteristics of my invention, reference may now be had to the drawings, which show how the same may be practically carried out in a simple and inexpensive manner, equivalent elements for some of those illustrated, however, being entirely feasible and equally desirable.

Figure 2:
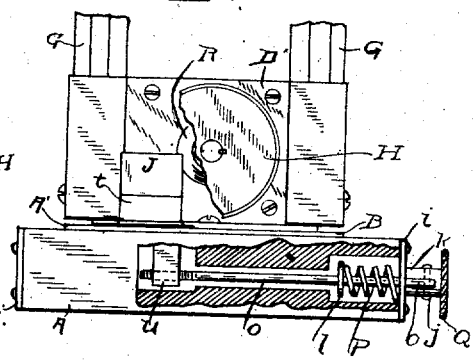
Figure 3:
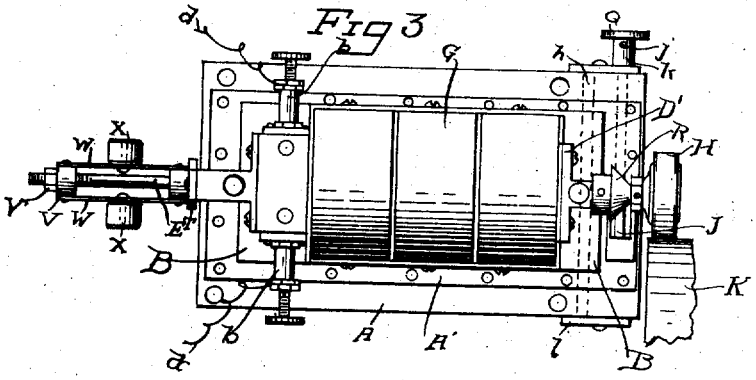
Figure 4:
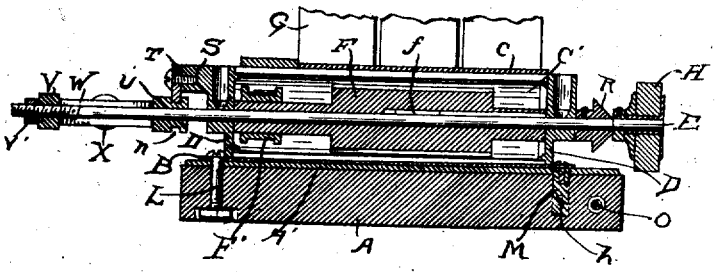
Figure 5:
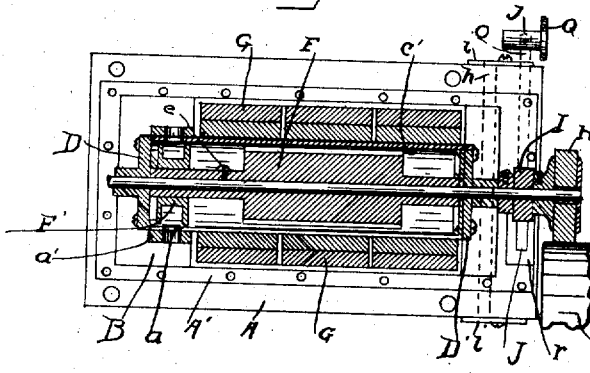
Figure 6:
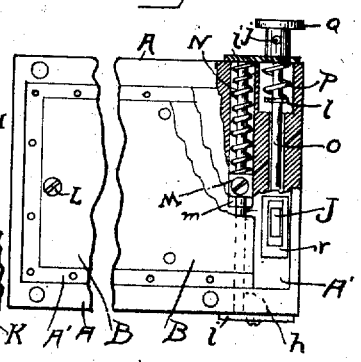
Figure 7:
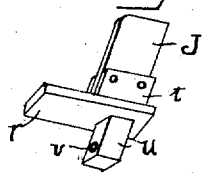
Figure 8:
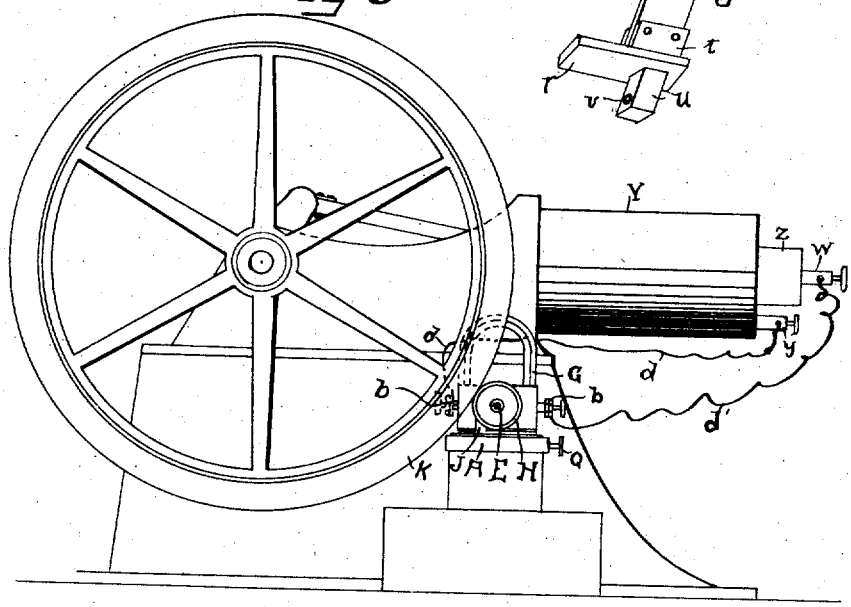

In the drawings in which similar reference characters indicate corresponding parts, Figure 1 is a perspective view of a machine having my invention applied thereto; Fig. 2, a fragmentary end elevation with parts broken away and showing particularly the means employed for holding the generator-pulley in proper relation to the engine-wheel; Fig. 3, a top plan view of the device; Fig. 4, a fragmentary vertical central sectional view taken longitudinally of the machine; Fig. 5, a horizontal sectional view in the plane of the armature-shaft; Fig. 6, a top plan view of the main base and the generator-base in which parts are broken away and exposing the means for controlling the positions of the generator-pulley, and also a resistance-spring whereby the generator-pulley may be pushed toward the engine-pulley and at the same time compensate for inaccuracy of the surface of the engine-pulley to avoid damage to the generator; Fig. 7, a perspective view of a part which has contact with the generator-shaft or other part of the generator for holding the generator-pulley, and Fig. 8 is a side elevation diagrammatically showing a gas-engine and the operative relation of my invention thereto.

Constructed as shown, A designates a main base or foundation, which may be suitably anchored to a floor or upon a bracket. It is designed to be fixed when in practical use and supports the whole mechanism of the generator. Usually it is surmounted by a cap-plate A'. A generator-base B is suitably pivoted to the main base A, as by means of a pivot-bolt L at ends of the members. At the opposite ends means are provided whereby the base B may be caused to swing about its pivot upon the main base A, as will be further explained.

C indicates magnetic poles that are the extremities of pole-pieces C', secured to the base B and supporting heads D D', which are provided with journal-housings in which an armature-shaft E is rotatively mounted, a suitable armature-core F being carried by the shaft E, as is also a commutator F'. To the pole-pieces C' are attached U-shaped magnets G. The usual armature-windings are omitted in the detail drawings, being unnecessary to an understanding of my invention. A small pulley H is secured to one end of the shaft E and obviously may be shifted with the base B and shaft E relatively to the main base A laterally thereto. It should be understood that in practically carrying out my invention the heads D D' or similar shaft-supports may be attached to the generator-base or the supplemental base B' and have no direct attachment with the pole-pieces C', and the generator-base B may be of any suitable form and may be pivoted to the base A in various ways for attaining the desired results, as will be obvious. A suitable pulley I is also attached to the shaft E and is adapted to be engaged by a movable post J, that is suitably operated and controlled, whereby the lateral movement of the shaft is caused and whereby the fixed positions of the pulley H referred to are maintained. The post has a base *r* and post-holder *t* and also has a foot *u*, in which is a threaded hole *v*. A spindle O is mounted in the base A and has a threaded end working in the hole *v*, the base *r* sliding upon the top of the main base A or upon the plate A', while the foot extends through a suitable aperture therein. The spindle O extends through a plate *i* and preferably has a collar *l*, between which and the plate *i* is a spring P. To the outer end of the spindle O is attached a thumb-wheel Q, having a long bifurcated stem straddling the end of the spindle and connected thereto by a pivot-pin *j*, so that when once the spindle O is adjusted with relation to the post J the spindle may be moved longitudinally inwardly without disturbing the adjustment by simply turning the bearing end *k* of the stem of the wheel Q away from the plate *i*, as shown in Fig. 5. The thumb-wheel Q, having a long stem, as will be seen, is designed to operate eccentrically as a cam and illustrates a simple form of construction; but in some cases I may attain the same results by practically equivalent means, and the same may be prevented from accidentally shifting by other means than the spring P; also, the spindle O may be fixed to the foot *u* and be made adjustable with the thumb-wheel Q or similar device.

The armature-core F may be secured to its shaft E by any suitable means, such as a screw *e* or a key, or the shaft may be made in two parts and sunk into the ends of the core. An insulating-plate *a'* is attached to each pole-piece C' where it projects from the magnet, a hole *a* being provided into which the brush-holder *b* is inserted and secured.

In order to normally press the pulley I into close contact with the post J, yet permit of breaking contact between them, I provide a resistance-spring, which in the present case is a coiled spring N, mounted on a rod H, which extends through the base A and bears against opposing plates *i i*, attached to the opposite sides of the main base. The spring is seated against that one of such plates against which the spring P bears and presses against a lug M, suitably secured to the under side of the base B and extending through an aperture *m* in the plate A', the rod *h* extending through the lug M and preventing the base B from being raised from the main base A. Obviously I may employ a plate-spring suitably disposed in lieu of the coiled spring N described. Also the post J or a similar device operated substantially as described may engage the housing of the shaft E or the shaft itself or any other suitable part of the pivoted portion of the machine; but the most delicate and desirable adjustment of the pulley H may be had with the use of the pulley I, the post J having an anti-frictional contact-face.

The construction above described is suitable more particularly where the generator is to be used solely in connection with a stationary engine; but when I design the generator so as to be equally adapted for use with the gas-engine of an automobile or like locomotive vehicle, where manual adjustment of the post J may be inconvenient owing to the wide range of speeds of the vehicle-engine, and also as between it and a stationary engine, I provide means whereby results are attained which in effect are identical with that of moving the post J from and toward the shaft E. To accomplish this, I provide that the shaft E be of greater length than usual and that it may move endwise in its bearings either by securing a spline *f* to the shaft E and fitting the shaft slidingly in the core F and providing a splineway in the core or by securing the shaft E to the core F and making the core of such length as to be suitably shorter than the distance between the heads D and D′, against which it is stopped in its endwise movement. The latter has an advantage in that increased wearing-surface by the brushes on the commutator may thus be had. A conical pulley R is attached to the shaft E in lieu of the pulley I, and at the opposite end of the shaft I secure thereto a speed-controlled governor comprising a head V, which is adjustable on the shaft, preferably as a screw-nut to be fixed by a jam-nut V′. To the head V, I attach a pair of plate-springs W, which normally extend parallel with the shaft E toward the opposite end thereof, the opposite ends of the springs being secured to a sleeve U, having an exterior groove *n*, in which is inserted a stop-yoke T, secured to a projection S of the head D, the shaft working through the sleeve. Weights X X are secured to the springs W W, so as to be at opposite sides of the shaft E. Obviously I may employ an electrically-controlled adjuster in lieu of the speed-controlled devices. A brake effect results from the action of the post J against the surface of the pulley R, and as the governor moves the conical wheel R, so that the post diminishes the pressure of the pulley against the engine-wheel, the brake effect is thereby increased, so as to immediately tend to reduce the speed of the generator-pulley. Therefore the post J controls the speed of said pulley in two ways: first, by way of controlling the degree of contact between said pulley and the engine-wheel, and in the second place by acting as a brake to retard or to relieve the movement of said pulley.

When in operative position, the generator is situated in proximity to the balance-wheel K of a gas-engine as the most advantageous position, or it may be located close to another suitable wheel or pulley of the engine, the pulley H being set so that it may be in contact therewith and withdraw from contact when desired.

Y indicates the engine-cylinder, and Z an explosion-chamber, suitably-disposed binding-posts *w y* being provided, to which are connected conducting-wires *d d′*, having their opposite ends connected to the brush-holders *b b*. A spark-coil should be connected with one of the wires, as usual.

In practical use let it be assumed that the generator is designed for use with a stationary engine and has been set in place. The wheel K may then be rotated, the pulley H being in contact therewith, when a current will be at once generated of sufficient strength (especially by my improved machine) to produce a spark in the igniters. Then as the speed of the wheel K increases and when the generator-shaft may have attained an economical rate of speed consistent with proper lubrication of its journals the thumb-wheel Q may be manipulated, so as to draw the pulley H off from a hard contact with the wheel K, the post J holding the pulley H at the exact required position, as above described, to maintain the desired velocity of the generator-shaft. No further adjustment will usually be required, as the ordinary variations of speed of the engine will not affect the utility of the generator. It may be necessary when again starting to turn the wheel Q, (eccentrically,) as in Fig. 5, and release the post J from contact, so that the spring N may push the pulley again into closer contact with the wheel K, to so remain until the desired speed may again be attained by the generator-shaft, when the wheel Q may be again set in its normal position, as in Fig. 3. Should there be excessive eccentricity of the periphery of the driving-wheel K, all danger to the delicately-constructed generator will be avoided by reason of the action of both the resistance-spring N and the post J, as will be obvious.

If it be assumed that the generator is designed for motor-vehicles or to provide against the generator being carelessly run at damaging speeds, the adjuster is employed, which causes the pulley H to be held sufficiently remote from a hard contact with the driving-wheel K to prevent damage in case the post J may not have been itself closely adjusted. In the use of this construction as described the post may be first set as above described, and then after making tests the head V may be adjusted and set so that before a dangerously-excessive speed may have been reached the weights X X may by their weight and centrifugal force furnish power and spread the springs W W and cause the shaft E to move endwise and push the conical pulley R against the post J and diminish the intensity of the contact of the pulley H with its driving-wheel, thus preventing further acceleration of speed of the generator-shaft. This action is extremely sensitive and does not partake of the harsh jerking fast and slow or slip and catch action incidental to intermittently throwing the pulley H into and out of contact entirely with the driving-wheel; but the pulley H is maintained substantially in a fixed position with respect to the driving-wheel peripheral path at which it may have been adjusted to run, causing a steady rate of speed and smooth motion proportionate to the intensity of the contact. When applied to a motor-vehicle, the engine-wheel may be run at great extremes of high and low velocity, and the balance-wheel being comparatively small requires a different setting of the head V, as will be obvious, to suit the conditions that differ from stationary-engine practice, and it may be so adjusted that manipulation of the wheel Q may not be necessary after the first adjustment thereof, the speed-controlled adjuster automatically performing the required function.

Having shown operative means whereby the driven pulley may be held in a position so as to be affected only by the merest contact with a true wheel or by peripheral protuberances of the driving pulley or wheel, I do not confine my invention to such specific means, as I may employ other suitable equivalent mechanism for automatically adjusting the post J or its equivalent in lieu of the longitudinally-moving shaft and the other elements described specifically.

What I claim as my invention, and desire to secure by Letters Patent, is—

1. A mechanism including a driving-wheel, a driven wheel, a stop for holding the driven wheel out of forcible contact with the driving-wheel, and means for adjusting the position of said stop.

2. A mechanism including a driving-wheel, a driven wheel operated by means of the driving-wheel, a stop member holding the driven wheel out of forcible contact with the driving-wheel, and power-controlled means whereby the axial positions of the driven wheel may be changed.

3. A mechanism including a driving-wheel, a driven wheel operated by means of the driving-wheel, a spring operating to push the driven wheel into contact with the driving-wheel, and a stop member operating against the pressure of the spring for limiting the approach of the driven wheel to the periphery of the driving-wheel.

4. A mechanism including a driving-wheel, a driven wheel operated by means of the driving-wheel, a spring operating so as to push the driven wheel into contact with the driving-wheel, a stop member restricting the action of the spring and holding the driven wheel out of forcible contact with the driving-wheel, and power-controlled means whereby the axial positions of the driven wheel may be changed.

5. A speed-reducing mechanism including a driving-wheel, a driven wheel operated by means of the driving-wheel, a spring operating to yieldably push the driven wheel into contact with the driving-wheel, and means restricting the action of the spring.

6. An electric generator provided with a base pivotally supporting an armature-shaft, a wheel attached to the armature-shaft for driving the same, and an adjustable stop member acting to limit the position of the armature-shaft relative to a driving-wheel.

7. An electric generator including a fixed base, a base pivoted upon the fixed base, an armature-shaft mounted on the pivoted base, a driven wheel attached to the armature-shaft, an adjustable fixed stop member adapted to limit the movement of the pivoted base and also that of the driven-wheel axis laterally, and a spring seated and acting to press the armature-shaft toward the stop member, and means whereby the stop member may be changed from and returned to its position without permanently altering its predetermined fixed position.

8. An electric generator comprising a main base, a supplemental base pivoted upon the main base, an armature-shaft supported upon the supplemental base, a driven wheel secured to the armature-shaft, a pulley also secured to the armature-shaft, a stop member slidingly supported upon the main base and engaging the pulley, a spindle mounted in the main base and operatively connected with the stop member whereby the positions thereof may be adjusted and fixed, and a spring operating to force the pulley elastically against the stop member.

9. An electric generator comprising a main base, a supplemental base pivoted upon the main base, an armature-shaft supported upon the supplemental base and movable endwise, a driven wheel secured to the armature-shaft, a conical pulley secured also to the armature-shaft, a stop member slidingly supported upon the main base and engaging the conical pulley, a spindle engaging the stop member whereby the positions thereof may be adjusted and fixed, a spring operating to force the conical pulley elastically against the stop member, and an adjusting mechanism operating automatically whereby the armature-shaft may be moved endwise and the conical pulley forced against the stop member.

10. An electric generator comprising a main base, a supplemental base pivoted upon the main base, an armature-shaft supported upon the supplemental base and movable rotatively and longitudinally, a driven pulley at one end of the armature-shaft secured thereto, a conical pulley secured to the armature-shaft in proximity to the driven pulley, a stop member slidingly supported and engaging the conical pulley, a spring forcing the conical pulley against the stop member, means whereby the positions of the stop member may be adjusted and fixed, a sleeve loose on the armature-shaft, means whereby movement of the sleeve longitudinally of the shaft may be prevented, a pair of plate-springs attached to the sleeve, a head attached to the plate-springs and also adjustably attached to the armature-shaft, and a weight attached to each one of the plate-springs.

11. The combination, with a rotative wheel of an electricity-generating machine, a rotative shaft for driving the machine, a stop mechanism whereby the rotative shaft may be held from approaching the rotative wheel, a wheel on the rotative shaft driven by means of the rotative wheel, and means whereby the rotative shaft may be yieldably pressed toward the stop member and also be permitted to be forced therefrom in the opposite direction.

12. The combination, with a rotative wheel, of an electricity-generating machine, a rotative shaft for driving the machine, a stop, mechanism for adjusting the same whereby the rotative shaft may be drawn away from the rotative wheel, a wheel on the rotative shaft driven by means of the rotative wheel, means whereby the rotative shaft may be yieldably pressed toward the stop member and also be permitted to be automatically forced away, means whereby the stop member may be held in fixed positions, and means whereby the stop member may be released from operating against the rotative shaft while starting the operation of the machine.

13. The combination, with a rotative wheel, of an electricity-generating machine, a rotative shaft for driving the machine, a stop member whereby the rotative shaft may be held in fixed axial positions from the rotative wheel, a wheel on the rotative shaft driven by means of the rotative wheel, means whereby the position of the stop member may be gaged, means whereby the stop member may be released from operation and again put into operation without permanently altering its prearranged gaged position, and an independent adjusting means operating automatically in coöperation with the stop member for changing the relative axial position of the rotative shaft with relation to the rotative wheel of the engine.

14. In an electricity-generating machine, a fixed main base, a supplemental base supported movably upon the main base, journal-housings supported by the supplemental base, a generator-shaft mounted rotatively in said housings, the spring acting against the supplemental base, the pulley or wheel attached to the generator-shaft whereby the machine may be driven, a conical pulley attached to the generator-shaft, and a stop member in contact with the conical pulley restricting the force of the spring.

15. In an electricity-generating machine, a fixed main base, a supplemental base, yielding means operating so as to change the relative positions of the supplemental base when not restrained, journal-housings supported by the supplemental base, a generator-shaft mounted rotatively in said housings, a stop member preventing the movement in one direction of the supplemental base, the pulley or wheel attached to the generator-shaft whereby to drive the machine, a conical pulley connected with the generator-shaft and movable across the face of the stop member so that the lineal circumferential bearing contact thereof with the stop member may be increased and decreased, and yieldingly-controlled means for moving and controlling the conical pulley in combination with a driving-wheel communicating to the pulley of the generator-shaft a diminished rate of peripheral speed.

16. In an electricity-generating machine, a stop member provided with an antifrictional contact-face, a conical pulley operating in contact with said stop member, a spindle or shaft connected with the stop member, a main base slidingly supporting the stop member, and an adjusting means connected with the spindle and adapted to be released from operation, in combination with the supplemental base, the generator-shaft supported upon the supplemental base and carrying the conical pulley, and means for yieldably pressing the conical pulley against the stop member.

In witness whereof I have hereunto affixed my signature in the presence of the witnesses herein named.

GARRETT W. HENRICKS.

Witnesses:
V. H. LOCKWOOD,
NELLIE ALLEMONY.